United States Patent Office 3,330,725
Patented July 11, 1967

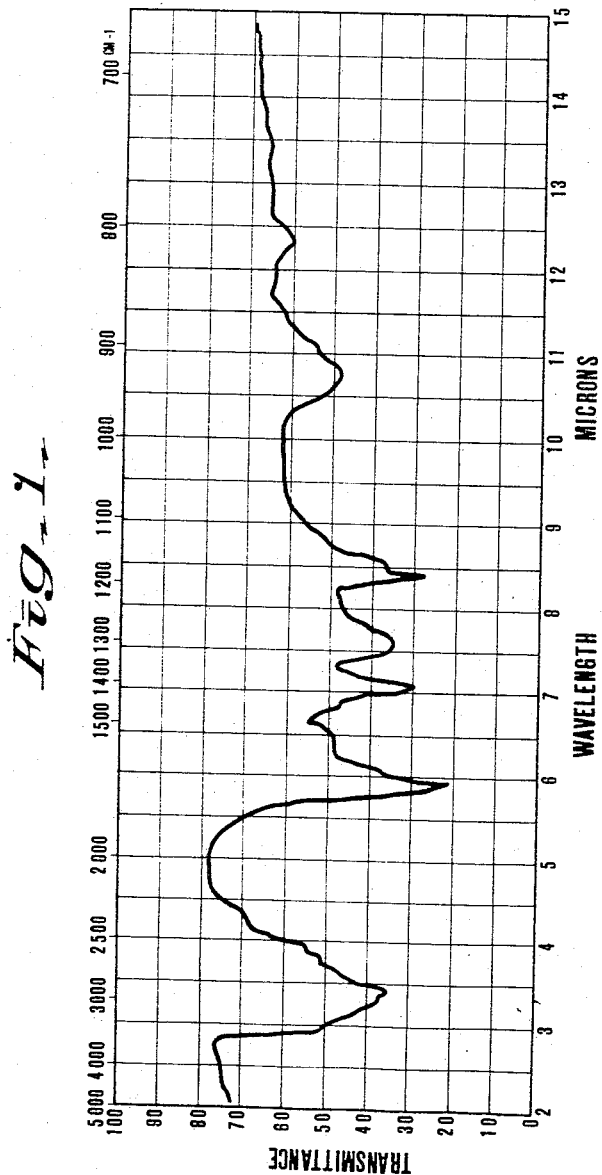

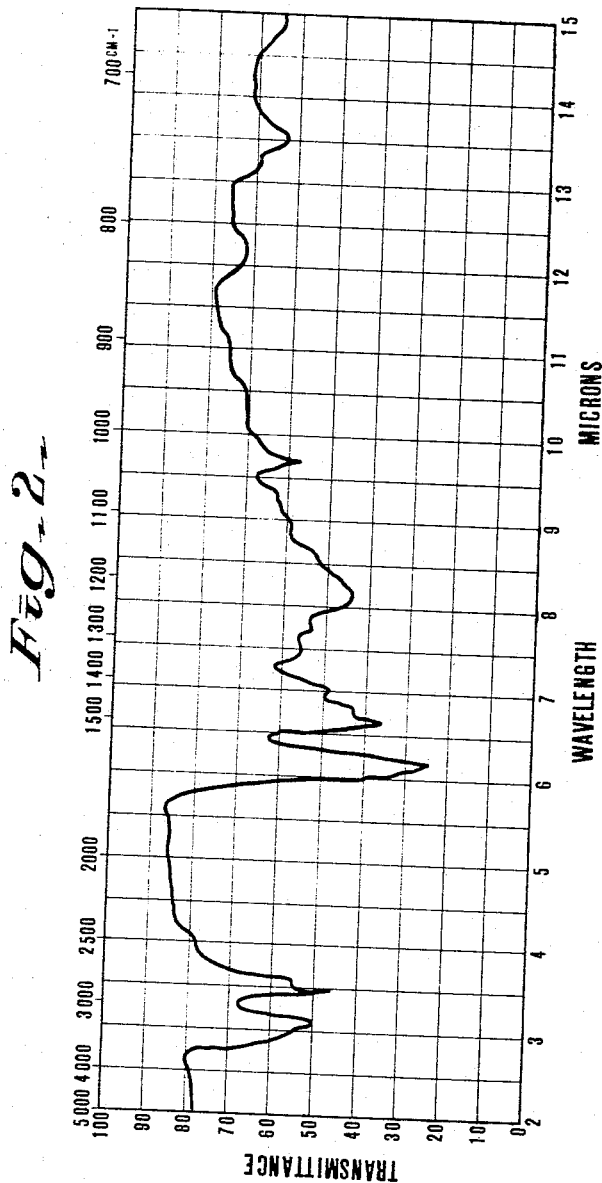

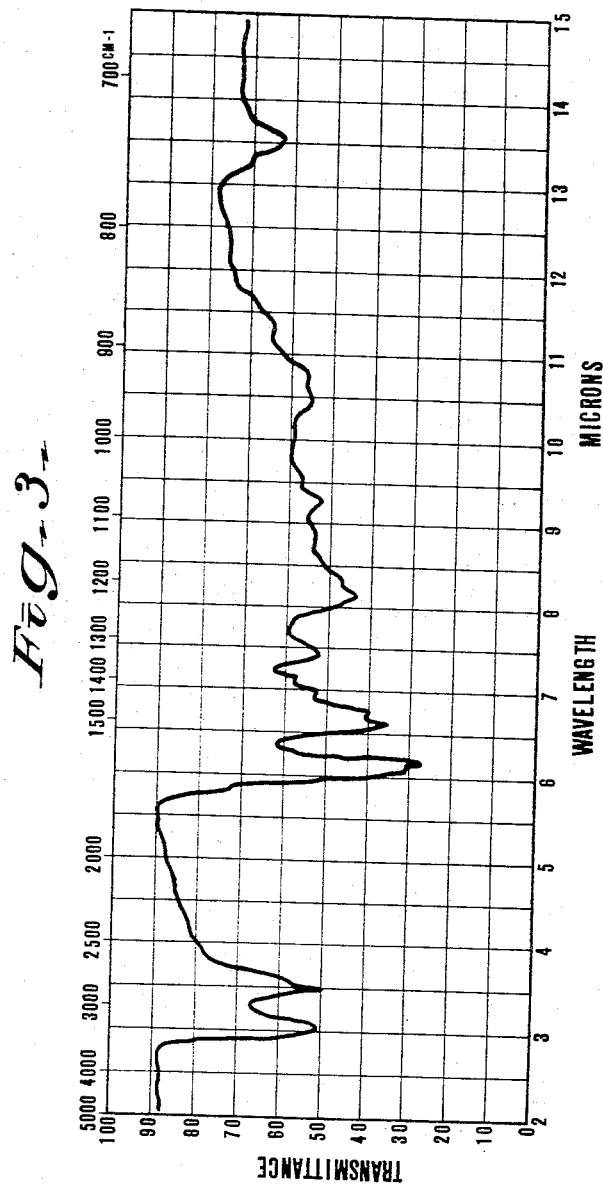

3,330,725
WATER-SOLUBLE DERIVATIVES OF RUFOMYCIN
Hayao Nawa, Nishitomatsu, Amagasaki, Koiti Nakazawa, Higashitomatsu, Amagasaki, and Akira Miyake and Takaaki Kamiya, Nishinomiya, Japan, assignors to Takeda Chemical Industries, Ltd., Osaka, Japan
Filed Jan. 29, 1962, Ser. No. 173,855
Claims priority, application Japan, Jan. 31, 1961, 36/3,150
12 Claims. (Cl. 167—65)

This invention relates to new and useful water-soluble derivatives of rufomycin.

Rufomycin is a general name of novel antibiotics rufomycin A and rufomycin B which are produced by *Streptomyces atratus* nov. sp. (ATCC-14046) isolated by Nakazawa et al. from soil of the Wakayama Prefecture in Japan, and which usually accumulate concomitantly in the culture broth of said microorganism. Rufomycin A and rufomycin B are very akin to each other in their physical and chemical properties, but rufomycin B is a little less active than rufomycin A in antimicrobial effects. Rufomycin A and rufomycin B and the preparation thereof are disclosed and claimed in copending application, Ser. No. 87,677, filed Feb. 7, 1961.

The isolated rufomycin is neutral peptide showing red brown to orange color in basic media and yellow in acidic media. More precise properties of rufomycin are shown as follows:

RUFOMYCIN A (a) insoluble in water and not easily soluble in ethyl ether, petrol ether, benzene, and carbon tetrachloride, but easily soluble in methanol, ethanol, propanol, ethyl acetate, chloroform, pyridine, dioxane, glacial acetic acid, acetone, dimethylformamide, and 2-methoxyethanol;

(b) negative to ninhydrin, Molish's, Fehling's, Sakaguchi's, ferric chloride, maltol, and sodium nitroprusside reactions;

(c) infrared absorption bands at the wave lengths in microns of 3.0, 3.27, 3.4, 6.04, 6.1, 6.53, 6.64, 6.90, 7.1, 7.32, 7.55, 8.02, 8.54, 8.85, 9.37, 9.80, 10.05, 10.37, 10.96, 11.43, 12.20, 13.15, and 13.55;

(d) ultraviolet absorption:

$\lambda_{max}$. 222 m$\mu$ ($E_{1cm}^{1\%}$=450), 282 m$\mu$ ($E_{1cm}^{1\%}$=100), and 355 m$\mu$ ($E_{1cm}^{1\%}$=27)

(e) specific rotation: $[\alpha]_D^{24}$=$-58°$ (c.=1%, in methanol);

(f) elementary analytical value of about 62% of carbon, about 7½% of hydrogen and about 12% of nitrogen;

(g) decomposes with hydrochloric acid to give L-alanine, L-leucine, L-N-methylleucine, δ-hydroxy-nor-leucine and its lactone, L-tryptophen, and 3-nitro-4-hydroxyphenylalanine; and (h) molecular weight: about 1,050, calculated on the basis of the absorption at the wave length of 425 millimicrons in a mixture of methanol and 0.1 N-NaOH (9:1), in comparison with the absorption at the same wave length of 3-nitro-4-hydroxyphenylalanine, provided that one mole of the amino acid is contained in one mole of rufomycin A.

RUFOMYCIN B (a) yellow crystals melting at 165–168° C. with decomposition;

(b) insoluble in water, hardly soluble in ethyl ether, petrol ether, benzene, and carbon tetrachloride, and slightly soluble in ethanol, and butanol, but easily soluble in methanol, ethyl acetate, chloroform, pyridine, dioxane, and glacial acetic acid;

(c) negative to ninhydrin, Molish's Fehling's Sakaguchi's, ferric chloride, maltol, and sodium nitroprusside reactions;

(d) infrared absorption bands at the wave length in microns of 3.04, 3.26, 3.38, 5.94, 6.05, 6.10, 6.53, 6.6, 6.9, 7.1, 7.25, 7.34, 7.62, 7.85, 8.05, 8.05, 8.32, 8.50, 8.85, 9.26, 10.35, 10.90, 1145, 1215, 13.10, and 13.55, in potassium bromide disk;

(e) ultraviolet absorption:

$\lambda_{max}$. 222 m$\mu$ ($E_{1cm}^{1\%}$=524), 282 m$\mu$ ($E_{1cm}^{1\%}$=113), and 355 m$\mu$ ($E_{1cm}^{1\%}$=28)

(f) specific rotation: $[\alpha]_D^{24}$=$-73°$ (c.=1%, in methanol);

(g) pKa' 8.4 in aqueous ethanol;

(h) elementary analytical value of about 62% of carbon, about 8% of hydrogen, and about 12% of nitrogen;

(i) decomposes with hydrochloric acid to give L-alanine, L-leucine, L-N-methylleucine, δ-hydroxy-nor-leucine and its lactone, L-tryptophan, and 3-nitro-4-hydroxyphenylalanine; and (j) molecular weight: about 1,050, calculated on the same basis as in rufomycin A.

One of the most striking characteristics of rufomycin is observed in its antimicrobial spectrum which shows that rufomycin has a remarkable inhibitory action specifically to acid-fast bacteria, especially against Mycobacterium tuberculosis var. hominis, but is little active to inhibit the growth of the other bacteria. Moreover, it is noteworthy that rufomycin is at least as effective as streptomycin or dihydroesterptomycin against Mycobacteria and its inhibitory activity is observed even against the strains resistant to known antibiotics such as streptomycin, dihydrostretomycin, neomycin, etc.

The practical application of rufomycin to human bodies as remedies is, however, restricted because of its little solubility in water. An aqueous suspension of rufomycin is not so active in vivo as in vitro. But, it was found by Nakazawa et al. that rufomycin is effective in vivo when it is solubilized in water for example by the use of a suitable solvent and a non-ionic surface active agent.

On the other hand, the present inventors have found that rufomycin, i.e. rufomycin A and/or rufomycin B, has in its molecule the radical capable of forming esters with acids, that polybasic acid esters of rufomycin can form the salt with an alkaline substance without any substantial transformation in the rufomycin moiety, that the salts are soluble in water and retain the same degree of antimicrobial activity in vitro as free rufomycin, and particularly that the salts exhibit the antimicrobial activity in vivo against acid-fast bacteria.

The principal object of the present invention is therefore to provide new water-soluble derivatives of rufomycin showing remarkable inhibitory action to acid-fast bacteria in vivo as well as in vitro.

Another object of this invention is to provide a method for producing said new and useful derivatives of rufomycin, i.e. polybasic acid partial esters formed with rufomycin and water-soluble salts of the partial esters.

To realize the latter object, rufomycin—i.e. rufomycin A and/or rufomycin B—is allowed to change into the corresponding partial ester of a polybasic acid and the ester is neutralized with a base. As the polybasic acid, an organic acid having two or more carboxyl groups and having four to ten carbon atoms, such as succinic acid, maleic acid, fumaric acid, malic acid, glutaric acid, adipic acid, pimelic acid, azelaic acid, sebacic acid, citric acid, citraconic acid, phthalic acid, terephthalic acid, etc. and an inorganic acid having two or more acidic hydroxyl groups which can easily be dissociated in water to form anions of the acid with the liberation of protons, e.g. such a polybasic oxygen acid as sulfuric acid, phosphoric acid, or the like.

The esterification can be brought about by allowing rufomycin to react with the above-said polybasic acid or with its functional derivative such as acid anhydride, an acid halide, e.g. chloride, bromide or the like, under conditions according to those in ordinary esterification with such polybasic acid. For example, the polybasic carboxylic acid per se can form the partial esters with rufomycin under heating and/or in the presence of a catalytic amount of an acid such as sulfuric acid, hydrogen chloride, boron trifluoride, toluene sulfonic acid, benzene sulfonic acid, or of such a dehydrating agent as dicyclohexylimide, etc. The polybasic acid anhydride or the polybasic acid halide is more generally employed than the free acid for the esterification of rufomycin. When such a reactive derivative of the polybasic acid is used, a basic reaction-aid such as sodium carbonate, potassium carbonate, sodium hydrogen carbonate, potassium hydrogen carbonate, calcium carbonate, calcium hydroxide, magnesium carbonate, magnesium hydroxide, pyridine, picoline, quinoline, triethylamine, or the like may be utilized. Particularly, in the combination of the polybasic acid halide and the organic base as the reaction-aid, it seems that they form a complex and the complex takes part in the esterification.

At the reaction, the use of solvent is usually preferable. The solvent is desirably selected in accordance with the form and kind of the polybasic acid or of its functional derivatives. As the solvent, broadly stated, those capable of dissolving the starting rufomycin, for example, ethyl acetate, acetone, cyclopentanone, cyclohexanone, tetrahydrofuran, benzene, toluene, pyridine, dimethylformamide, etc. may be used.

The partial ester thus obtained in the form of free acid is not easily soluble in water but can easily form water-soluble salt as mentioned above by being neutralized with a base. The neutralization can be effected either by dissolving the ester in an aqueous solution of a desired alkaline agent or by adding a desired alkaline agent to the aqueous suspension of the ester, whereupon the salt corresponding to the partial ester and to the alkaline agent is obtained. The alkaline agent should be weak in its alkalinity; hence, for producing the desired water-soluble salts of the polybasic acid partial ester of rufomycin, the corresponding alkaline agent, preferably a strong alkali in the state of a diluted aqueous solution or a strong alkali salt formed with a volatile weak acid, such as diluted aqueous ammonia solution, an aqueous solution of an amine—e.g. triethylamine, trimethylamine—, an ammonium salt—e.g. ammonium carbonate, ammonium hydrogen carbonate—, and alkali or alkaline earth metal salt—e.g. sodium hydrogen carbonate, potassium hydrogen carbonate, calcium carbonate, magnesium carbonate, calcium hydroxide, magnesium hydroxide—may preferably be employed in an aqueous medium.

For obtaining the objective salt of the partial ester, the resultant aqueous solution of the same may be subjected for example to such a means as evaporation of water under reduced pressure, lyophilization, etc. Superheating should be avoided.

Thus obtained polybasic acid partial esters of rufomycin and their water-soluble salts have strong activity inhibiting the growth of acid-fast bacteria and the activity of these water-soluble salts is clearly observed even in vivo. To show the activity of said products, the results of several pharmacological experiments is shown below. In these experiments, the abbreviations "inf." and "s" occurring in Tables 2 to 5 mean "infinitive and uncountable because of widely spreading colonies" and "uncountable because of the contamination of other microorganisms," respectively.

*Experiment 1*

Minimum inhibitory concentration of rufomycin and typical polybasic acid partial esters of rufomycin in the form of free acids was tested against *Mycobacterium avium* Chester—streptomycin resistant strain deposited in Institute for Fermentation, Osaka, Japan, under the accession number IFO–3153—on glycerin-bouillon-agar through agar dilution method. The result was observed after the incubation for 42 hours at 37° C.

TABLE 1

| Compound: | Minimum inhibitory concentration (mcg./ml./agar) |
|---|---|
| Rufomycin A (free) | 1.0 |
| Rufomycin A hemisuccinate | 3.0 |
| Rufomycin A hemi-sulfate | 2.0–3.0 |
| Rufomycin A mono-phosphate | 3.0–5.0 |
| Rufomycin B (free) | 5.0 |
| Rufomycin B mono-phosphate | 15.0–20.0 |

*Experiment 2*

(1) Infection of Test Animals With the Strain $H_{37}Rv$

In a new aqueous medium prepared by adding 1 percent by weight of polysorbate 80 (U.S.P. (XIV) grade, sold by Atlas Powder Co., U.S.A. under the trade name of "Tween 80") to Souton-medium, *Mycobacterium tuberculosis* var. *hominis* $H_{37}Rv$ was incubated for 96 hours at 37° C. under shaking. The resultant bacteria were transplanted in a newly prepared medium of the same composition as above and incubated for 48 hours at 37° C. under shaking. The broth thus obtained was separated into solid part and clear liquid part by the use of centrifuge at the speed of 2,000 rounds per minute. The liquid part was diluted to make the volume 100 times as much, and respective 4 week old mice ($CF_1$ strain) were infected through tail vein injection with 0.2 milliliter of the diluted liquid, the viable unit of which was $98 \times 10^2$/mouse.

(2) Administration of Medicants

The infected mice were separated into six groups A to F. As the control, no treatment was made on the group A. On the other five groups B to F, the following respective treatments were made:

| Treatment | Test compound | Doseday/mouse, mg. | Administered volume of composition per mouse, ml. | Means of administration |
|---|---|---|---|---|
| B | Rufomycin A phosphate | 2.0 | 0.4 | Subcutaneously. |
| C | do | 1.0 | 0.4 | Do. |
| D | Rufomycin B phosphate | 2.0 | 0.4 | Do. |
| E | Dihydrostreptomycin | 2.0 | 0.4 | Do. |
| F | do | 1.0 | 0.4 | Do. |

The rufomycin A phosphate composition was prepared by dissolving 5 grams of rufomycin phosphate in 1 liter of 1% aqueous sodiumhydrogen-carbonate solution and by adjusting the concentration at the injection. The dihydrostreptomycin composition was prepared by dissolving 5 grams of dihydrostreptomycin in 1 liter of distilled water and by adjusting the concentration at the injection. The respective treatments were carried out at first 24 hours after the infection, and repeated once a day for 20 days.

(3) Observation of the Result of the Treatments

Mice were killed at 48 hours after the last administration of the compositions. Spleens, livers and lungs were picked out. The respective viscera were homogenized in the presence of 9 milliliters of sterilized water to give emulsions, to which 1 milliliter each of 10% aqueous sodium-hydroxide solution was added to prepare the test emulsion I. A part of the test emulsion I was diluted with 1% aqueous sodium-hydroxide solution by two steps by means of "10 times dilution" to prepare the test emulsions II and III, respectively. 0.1 milliliter each of the test emulsions in the respective steps was inoculated in 1% Ogawa medium [1] and incubated at 37° C. for 4 weeks. Colonies on the medium were counted in order to compare the results of the inhibitory effect in vivo of the compound against the strain $H_{37}Rv$.

(4) Results

Experiment 3

In a similar way to Experiment 2, 4.5 week old mice ($CF_1$ strain) were infected respectively with 0.2 milliliter of the diluted liquid corresponding to the viable unit of $4.1 \times 10^2$/mouse.

The infected mice were divided into three groups A, B and C. Each of groups A, B and C was further divided into sub-groups as shown below and streptomycin, rufomycin A phosphate and rufomycin A phosphate ammonium salt were respectively administered to the mice except those for controls by subcutaneous injection in the form of aqueous solutions which were prepared to make them contain the dose/day/mouse to be illustrated below per 0.4 milliliter thereof. The respective injections were

TABLE 2

| Group | Animal number | Spleen | | | Liver | | | Lung | | |
|---|---|---|---|---|---|---|---|---|---|---|
| | | I | II | III | I | II | III | I | II | III |
| A (Control) | 1 | inf | 24, 10 | 2, 2 | inf | 24, S | 3, 1 | 0 | 0, 0 | 0, 0. |
| | 2 | inf | inf, 100 | 8, 2 | inf | 100, S | 11, 17 | 28 | 2, 1 | 0, 0. |
| | 3 | inf | 44, 50 | 12, 9 | 100 | 21, 19 | 7, 3 | 12 | 1, 0 | 1, 0. |
| | 4 | inf | 100, inf | 21, 18 | S | inf | 18, 6 | 38 | 8, 10 | 2, 0. |
| | 5 | inf | inf | 24, 24 | inf | inf, 40 | 8, 7 | 20 | 2, 1 | 1, 0. |
| | 6 | inf | 89, 20 | 18, 9 | inf | 24, 34 | 5, 4 | 39 | 4, 8 | 0, 0. |
| | 7 | inf | 35, 67 | 5, 7 | inf | 62, 60 | 15, 9 | 2 | 0, 0 | 0, 0. |
| | 8 | inf | 78, 97 | 13, 7 | inf | inf | 27, 23 | 9 | 0, 0 | 0, 0. |
| | 9 | inf | 56, 77 | 6, 6 | S | 87, 25 | 12, 8 | 8 | 1, 1 | 0, 0. |
| B | 1 | 30 | 6, 7 | 3, 0 | S | 2, 0 | 0, 0 | 0 | 0, 0 | 0, 0. |
| | 2 | S | 20, 66 | 17, 3 | 40 | 4, 7 | 1, 0 | 0 | 0, 0 | 0, 0. |
| | 3 | 80 | 13, 14 | 1, 1 | 2 | 0, 0 | 0, 0 | 0 | 0, 0 | 0, 0. |
| | 4 | 10 | 3, 2 | 0, 0 | 0 | 0, 0 | 0, 0 | 0 | 0, 0 | 0, 0. |
| | 5 | 30 | 3, 3 | 0, 0 | 13 | 3, 1 | 1, 1 | 0 | 0, 0 | 0, 0. |
| | 6 | 30 | 11, 8 | 2, 1 | 2 | 2, 0 | 0, 0 | 2 | 0, 0 | 1, 0. |
| | 7 | 20 | 5, 2 | 1, 0 | 6 | 1, 0 | 1, 0 | 0 | 0, 0 | 0, 0. |
| C | 1 | 30 | 16, 18 | 2, 1 | 5 | 4, 1 | 0, 0 | 0 | 0, 0 | 0, 0. |
| | 2 | inf | 50, 50 | 9, 7 | 50 | 13, 7 | 1, 3 | 1 | 0, 0 | 0, 0. |
| | 3 | inf | inf, 50 | 12, 6 | 24 | 5, 4 | 3, 0 | 0 | 0, 0 | 0, 0. |
| | 4 | 100 | 20, 10 | 8, 6 | 0 | 3, 0 | 1, 0 | 12 | 0, 0 | 1, 0. |
| | 5 | inf | 58, 55 | 12, 9 | 0 | 9, 5 | 1, 0 | 30 | 4, 3 | 0, 0. |
| | 6 | 56 | 15, 13 | 3, 2 | 35 | 8, 6 | 0, 0 | 2 | 0, 0 | 0, 0. |
| | 7 | S | 40, 53 | 6, 9 | 17 | 4, 3 | 1, 0 | 0 | 0, 0 | 0, 0. |
| | 8 | 11 | 1, 0 | 1, 0 | 0 | 0, 0 | 0, 0 | S | 0, 0 | 0, 0. |
| | 9 | inf | 37, 20 | 3, 1 | S | 6, 3 | 0, 0 | inf | 26, 32 | 2, 0. |
| D | 1 | inf | 17, 80 | 5, 0 | 0 | 0, 0 | 0, 0 | 20 | 3, 2 | 1, 0. |
| | 2 | inf | 30, 16 | 7, 5 | 8 | 2, 2 | 0, 0 | 8 | 5, 4 | S, 0. |
| | 3 | inf | 12, 12 | 3, 1 | S | 2, 1 | 0, 0 | 9 | 0, 0 | 0, 0. |
| | 4 | inf | 32, 31 | 6, 4 | 9 | 2, 1 | 0, 0 | 0 | 0, 0 | 0, 0. |
| | 5 | inf | 4, 4 | 3, 0 | 10 | 3, 8 | 2, S | 0 | 0, 0 | 0, 0. |
| | 6 | inf | 85, 60 | 21, 12 | 15 | 6, 4 | 0, 0 | 7 | 1, 0 | 0, 0. |
| | 7 | inf | 32, 31 | 5, 3 | S | 4, 3 | 1, 0 | 4 | 0, 0 | 0, 0. |
| E | 1 | | | | 5 | 1, 0 | 1, 0 | 0 | 0, 0 | 0, 0. |
| | 2 | 0 | 0, 0 | 1, 0 | 40 | 6, 1 | 1, 0 | 0 | 0, 0 | 0, 0. |
| | 3 | 30 | 3, 2 | 2, 0 | 13 | 2, 2 | 0, 0 | 0 | 0, 0 | 0, 0. |
| | 4 | 56 | 6, 2 | 0, 0 | 6 | 1, 0 | 0, 0 | S | 0, 0 | 0, 0. |
| | 5 | 0 | 0, 0 | 0, 0 | 22 | 6, 2 | 0, 0 | 0 | 0, 0 | 0, 0. |
| | 6 | 0 | 0, 0 | 0, 0 | S | 2, 1 | 0, 0 | 0 | 0, 0 | 0, 0. |
| | 7 | 42 | 10, 6 | 3, 0 | S | 5, 3 | 1, 0 | 0 | 0, 0 | 0, 0. |
| | 8 | 40 | 0, 0 | 0, S | S | 5, 5 | 2, 0 | 3 | 6, 5 | 1, 1. |
| | 9 | 60 | 7, 6 | 1, 0 | S | 1, S | 0, 0 | 0 | 0, 0 | 0, 0. |
| F | 1 | 17 | 3, 1 | 1, 1 | 6 | 3, 0 | 0, 0 | 6 | 1, 1 | 0, 0. |
| | 2 | 70 | 8, 6 | 1, 0 | 23 | 5, 4 | 1, 1 | 0 | 0, 0 | 0, 0. |
| | 3 | 40 | 10, 1 | 2, 1 | 6 | 1, 0 | 0, 0 | 8 | 0, 0 | 0, 0. |
| | 4 | 25 | 6, S | 1, 1 | 20 | 4, 2 | 0, 0 | 2 | 0, 0 | 0, 0. |
| | 5 | inf | 25, 13 | 1, 0 | 6 | 3, 1 | 0, 0 | 1 | 0, 0 | 0, 0. |
| | 6 | 3 | 1, 0 | 0, 0 | S | 4, 2 | 0, 0 | 0 | 0, 0 | 0, 0. |
| | 7 | 16 | 4, 1 | 0, 0 | 8 | 3, 0 | 0, 0 | 0 | 0, 0 | 0, 0. |
| | 8 | 10 | 9, 9 | 1, 1 | 5 | 0, 0 | 0, 0 | 2 | 0, 0 | 0, 0. |
| | 9 | 20 | 3, 2 | 2, 1 | 30 | 4, 3 | 1, 0 | 0 | 0, 0 | 0, 0. |
| | 10 | 70 | 12, 4 | 1, 0 | S | 5, 1 | 0, 0 | 4 | 1, 0 | 0, 0. |

---

[1] 1%-Ogawa-medium consists of:
| | | |
|---|---|---|
| $KH_2PO_4$ | g | 1.0 |
| Sodium glutamate | g | 1.0 |
| Distilled water | ml | 100.0 |
| Glycerol | ml | 6.0 |
| 2% malachite green solution | ml | 6.0 |
| Whole eggs | ml | 200 | repeated once a day during 14 days for the group A, 20 days for the group B and 25 days for the group C.

Mice were killed at 48 hours after the last administration of the medicaments, and their spleens, livers and lungs were treated in the same manner as in Experiment 2 to obtain the result of Tables 3, 4 and 5 for the group A, B and C, respectively.

TABLE 3 (GROUP A)

| Compound | Dose/day/mouse | Animal number | Spleen I | Spleen II | Spleen III | Liver I | Liver II | Liver III | Lung I | Lung II | Lung III |
|---|---|---|---|---|---|---|---|---|---|---|---|
| Control | | 1 | inf., inf. | inf., inf. | 111, 10 | inf., inf. | inf., inf. | 1, 1 | 1, 1 | 1, 1 | 1, 1. |
| | | 2 | inf., inf. | inf., inf. | 22, 16 | inf., inf. | 35, 47 | 12, 5 | inf., 97 | 27, 28 | 1, 3. |
| | | 3 | inf., inf. | inf., 6.0 | 21, 10 | inf., inf. | 42, 35 | 4, 3 | inf., inf. | 32, 8 | 2, 0. |
| | | 4 | inf., inf. | inf., inf. | 10, 8 | inf., inf. | inf., 37 | | inf., inf. | 30, 27 | 4, 3. |
| Streptomycin | 3.0 mg | 1 | inf., inf. | 20, 19 | 5, 1 | 32 | 4, 4 | 0, 0 | 4, 3 | 1, 0 | 0, 0. |
| | | 2 | 61, 68 | 6, 3 | 5, 0 | 13, 8 | 2, 1 | 0, 0 | 13, 7 | 2, 1 | 0, 0. |
| | 2.0 mg | 1 | inf., inf. | 95, 50 | 4, 1 | 13, 12 | 2, 0 | 1, 1 | 5, 2 | 1, 0 | 2, 0. |
| | | 2 | inf., inf. | 32, 21 | 12, 3 | inf., inf. | 19, 19 | 3, 0 | 30, 16 | 2, 1 | 0, 0. |
| | | 3 | 100, 100 | 32, 21 | 4, 1 | 56, 34 | 7, 5 | 1, 0 | 14, 13 | 1, 0 | 0, 0. |
| | | 4 | 100, 100 | 50, 33 | 8, 1 | 100, 80 | 6 | 2, 2 | 36, 19 | 3, 3 | 1, S. |
| | 1.0 mg | 1 | inf., 11 | 95, 50 | 12, 3 | inf., inf. | 19, 19 | 3, 0 | 30, 16 | 2, 1 | 2, 0. |
| | | 2 | inf., inf. | 90, 50 | 14, 5 | inf., inf. | 6, 5 | | inf., 48 | | |
| | | 3 | inf., inf. | 77, 10 | 11, 11 | 56, 44 | 11, 11 | 1, 0 | inf., 48 | 15, 12 | 1, 0. |
| | | 4 | inf., inf. | 52, 50 | 7, 5 | 11, 8 | | | 14, 10 | | |
| Rufomycin A phosphate | 3.0 mg | 1 | 41, 19 | 2, 1 | 1, 1 | 9, 4 | 2, 1 | 1, 1 | 25, 18 | 0, 0 | 0, 0. |
| | | 2 | 13, 4 | 0, 0 | 0, 0 | 15, 9 | 4, 2 | 0, 0 | 0, 0 | 0, 0 | 0, 0. |
| | 2.0 | 1 | inf., inf. | 45, 44 | 4, 3 | 31, 28 | 3, 3 | 1, 1 | 14, 7 | 1, 0 | 1, 0. |
| | | 2 | inf., inf. | 70, 60 | 12, 3 | 73, 42 | 8, 4 | 2, 1 | 98, 79 | 13, 6 | 0, 0. |
| | | 3 | 83, 51 | 9, 0 | 2, 1 | 13, 4 | 1, 1 | 0, 0 | 3, 3 | 0, 0 | 0, 0. |
| | 1.0 mg | 1 | inf., inf. | 65, 42 | 9, 10 | 50, 36 | 2, 1 | 1, 0 | 63, 41 | 1, 1 | 0, 0. |
| | | 2 | inf., inf. | 40, 49 | 12, 14 | 49, 41 | 8, 1 | 1, 1 | 52, 23 | 1, 1 | 0, 0. |
| | | 3 | inf., inf. | 77, 70 | 8, 7 | 30, 23 | 8, 3 | 0, 0 | 50, 44 | 14, 11 | 0, 0. |
| Rufomycin A phosphate ammonium salt | 3.0 mg | 1 | inf., inf. | inf., 85 | 16, 6 | 22, 4 | 5, 4 | S, 1 | 58, 32 | 10, 9 | 1, 2. |
| | | 2 | inf., inf. | inf., 86 | 18, 15 | inf., 89 | 18, 18 | 4, 0 | inf., inf. | 34, 20 | 1, 0. |
| | 2.0 mg | 1 | inf., inf. | 62, 32 | 4, 0 | inf., 50 | 6, 2 | 1, 0 | inf., 90 | 14, 9 | 0, 0. |
| | | 2 | inf., inf. | 78, 49 | 10, 8 | 63, 10 | 4, 3 | 0, 0 | 79, 44 | 10, 3 | 0, 0. |
| | | 3 | inf., inf. | 58, 54 | 9, 8 | S, S | 14, 10 | 3, 2 | 2, 0 | 1, 1 | 0, 0. |
| | 1.0 mg | 1 | inf., inf. | 47, 35 | 7, 5 | inf., inf. | 28, 19 | 5, 1 | inf., inf. | 37, 25 | 5, 1. |
| | | 2 | inf., inf. | 80, 58 | 11, 17 | 95, 74 | 30, 21 | 1, 0 | 87, 39 | 46, 17 | 6, 2. |

TABLE 4.—(GROUP B)

| Compound | Dose/day/mouse | Animal number | Spleen I | Spleen II | Spleen III | Liver I | Liver II | Liver III | Lung I | Lung II | Lung III |
|---|---|---|---|---|---|---|---|---|---|---|---|
| Control | | 1 | inf., inf. | 70, 80 | 17, 13 | 80, inf. | 50, 18 | 1, 6 | inf., inf. | inf., inf. | 20, 27. |
| | | 2 | inf., inf. | 70, 80 | 8, 8 | inf., inf. | 19, 32 | 1, 2 | inf., inf. | inf., inf. | 16, 20. |
| | | 3 | inf., inf. | 100, 100 | 14, 24 | inf., inf. | inf., inf. | S, 5 | inf., inf. | 50, inf. | S, 40. |
| | | 4 | inf., inf. | inf., inf. | 15, 30 | inf., inf. | 50, 50 | 4, 5 | S, S | inf., inf. | 24, 30. |
| Streptomycin | 3.0 mg | 1 | inf., inf. | 34, 22 | 8, 1 | 24, 6 | 8, 3 | 2, 0 | inf., inf. | 22, 14 | 3, 0. |
| | | 2 | inf., inf. | 100, 92 | 24, 15 | inf., 96 | 11, 9 | 2, 1 | inf., inf. | 24, 18 | 3, 0. |
| | | 3 | inf., inf. | inf., inf. | 43, 30 | 5, 0 | 0, 0 | 0, 0 | inf., inf. | 96, 31 | 4, 1. |
| | 2.0 mg | 1 | inf., inf. | 100, 34 | 6, 6 | 18, 51 | 7, 21 | 1, 1 | 100, 34 | 6, 2 | 1, 1. |
| | | 2 | inf., 100 | 59, 50 | 5, 8 | 42, 43 | 14, 6 | 0, 0 | 100, 80 | 14, 15 | 1, 1. |
| | | 3 | inf., 100 | 100, 63 | 0, 4 | 100, 100 | 20, 19 | 3, 0 | 100, 100 | 17, 17 | 1, 1. |
| | | 4 | inf., inf. | 100, 55 | 6, 8 | inf., 100 | 19, 15 | 1, 2 | inf., inf. | 100, 88 | 8, 13. |
| | 1.0 mg | 1 | 100, 100 | 31, 45 | 5, 6 | 2, 4 | S, 11 | 0, 3 | inf., inf. | 20, 37 | 3, 4. |
| | | 2 | inf., inf. | 51, 65 | 4, 7 | S, S | 1, 9 | 1, 1 | 45, 46 | 5, 8. | |
| | | 3 | inf., 51 | 25, 25 | 4, 4 | 13, 3 | 3, 2 | 0, 0 | inf., inf. | 27, 32 | 5, 4. |
| | | 4 | 100, 100 | 40, 37 | 7, 2 | 78, 68 | 22, 11 | 2, 1 | 41, inf. | 7, 4 | 0, 0. |
| Rufomycin A phosphate | 3.0 mg | 1 | inf., inf. | 50, 29 | 6, 4 | 59, S | 11, 10 | 0, 0 | inf., inf. | 27, 22 | 4, 1. |
| | | 2 | 55, 36 | 13, 10 | 2, 1 | 20, 5 | 15, 12 | 1, S | 25, 11 | 2, 1 | 0, 0. |
| | 2.0 mg | 1 | 100, inf. | 32, 46 | 4, 3 | 48, 22 | 10, 5 | 2, 0 | 24, 34 | 2, 3 | 0, 0. |
| | | 2 | S, 100 | 32, 127 | 4, 6 | 26, 29 | 6, 10 | 0, 1 | 59, 78 | 12, 7 | 1, 1. |
| | | 3 | inf., inf. | 89, 76 | 18, 7 | 40, 24 | 12, 8 | 1, 1 | inf., inf. | 28 | 2, 0. |
| | | 4 | inf., inf. | 100, 100 | 22, 13 | inf., inf. | 22, 10 | 1, 1 | 48, 26 | 31, 23 | 5, 2. |
| | 1.0 mg | 1 | 100, inf. | 71, 62 | 9, 3 | 10, 11 | 1, 2 | 0, 1 | 100, inf. | 41, 19 | 1, 0. |
| | | 2 | inf., inf. | 100, 80 | 7, 9 | 100, 100 | 30, 9 | 1, 1 | inf., inf. | 59, 9 | 9, 4. |
| | | 3 | inf., inf. | 100, 100 | 28, 29 | 44, S | 8, 9 | 0, 1 | 100, 100 | 39, 48 | 2, 4. |
| | | 4 | inf., inf. | inf., 100 | 33, 17 | 100, inf. | 16, 50 | 9, 10 | inf., inf. | inf., inf. | 72, 70. |
| Rufomycin A phosphate ammonium salt | 3.0 mg | 1 | inf., inf. | inf., inf. | 4, 8 | 24, 50 | 5, 7 | 0, 1 | 100, 100 | 15, 20 | 2, 5. |
| | | 2 | inf., inf. | 100, 100 | 8, 12 | 70, 24 | 2, 4 | 0, 0 | S, S | 18, 24 | 1, 5. |
| | | 3 | 23, 47 | 10, 10 | 1, 2 | 17, 32 | 2, 3 | 0, 2 | 2, 3 | 1, 1 | 0, 0. |
| | 2.0 mg | 1 | inf., inf. | 39, 21 | 5, 3 | 63, 50 | 15, 6 | 1, 1 | 90, 81 | 15, 11 | 2, 0. |
| | | 2 | 100, 100 | 19, 24 | S, 0 | 38, 23 | 5, 3 | 1, 0 | 84, 71 | 13, 11 | 1, 0. |
| | | 3 | inf., inf. | 100, 90 | 13, 11 | 48, 46 | 5, 3 | 0, 0 | inf., inf. | 34, 30 | 5, 4. |
| | 1.0 mg | 1 | inf., inf. | 40, 70 | 5, 8 | 32, 36 | 8, 11 | 1, 2 | inf., inf. | 30, 42 | 2, 2. |
| | | 2 | inf., inf. | inf., inf. | 56, 32 | 80, 100 | 8, 14 | 0, 2 | inf., inf. | inf., inf. | 25, 40. |
| | | 3 | inf., inf. | 47, 41 | 10, 0 | 88, 42 | 5, 3 | 3, 1 | inf., inf. | 49, 39 | 5, 4. |
| | | 4 | inf., inf. | 88, 79 | 10, 8 | 75, 13 | 8, 4 | 3, 0 | inf., inf. | 90, 73 | 18, 15. |

TABLE 5 (GROUP C)

| Compound | Dose/day/ mouse | Animal number | Spleen | | | Liver | | | Lung | | |
|---|---|---|---|---|---|---|---|---|---|---|---|
| | | | I | II | III | I | II | III | I | II | III |
| Control | | 1 | inf., inf | 100, 35 | 3, 3 | 7, 5 | 10, 5 | 1, 0 | inf., inf | inf., 71 | 44, 3. |
| | | 2 | inf., inf | 100, 100 | 29, 20 | 6, 5 | 42, 16 | 4, 0 | inf., 100 | 100, 100 | 53, 36. |
| | | 3 | inf., inf | 47, 23 | 2, 10 | 46, 46 | 11, 18 | 1, 0 | inf., inf | inf., 100 | 15, 18. |
| | | 4 | inf., inf | 28, 100 | 2, 5 | 34, 8 | 14, 32 | 4, 3 | inf., inf | 100, 100 | 25, 7. |
| Streptomycin | 3.0 mg | 1 | inf., inf | 50, 53 | 6, 8 | S, S | 23, 15 | 1, 2 | inf., 80 | 40, 21 | 2, 6. |
| | | 2 | inf., inf | 14, 26 | 0, 0 | S, S | 9, 2 | 0, 1 | inf., inf | 14, 17 | 1, 6. |
| | | 3 | inf., inf | inf., 100 | 8, 14 | S, S | 2, 6 | 0, 1 | inf., inf | inf., inf | 18, 25. |
| | | 4 | inf., inf | 50, 80 | 3, 13 | S, 10 | 2, 5 | 0, 0 | 60, S | 20, 20 | 1, 3. |
| | 2.0 mg | 1 | inf., inf | 39, 31 | 18, 12 | 16, 13 | 13, 6 | 1, 2 | inf., inf | 22, 18 | 4, 4. |
| | | 2 | inf., inf | 100, 100 | 36, 28 | inf., inf | 88, 60 | 8, 5 | inf., inf | inf., inf | 19, 18. |
| | | 3 | inf., inf | 100, 75 | 6, 7 | 18, 11 | 3, 1 | 2, 0 | inf., inf | 39, 23 | 2, 1. |
| | | 4 | inf., inf | 100, 70 | 5, 10 | 8, 8 | 1, 2 | 1, 0 | inf., inf | 50, 50 | 6, 7. |
| | | 5 | inf., inf | inf., 100 | 3, 11 | 20, 40 | 0, 0 | 0, 0 | inf., inf | 55, 70 | 6, 13. |
| | 1.0 mg | 1 | inf., inf | 100, 100 | 49, 10 | 100, 76 | 13, 37 | 5, 5 | inf., inf | 100, 100 | 27, 22. |
| | | 2 | inf., inf | 85, 79 | 10, 6 | 61, 43 | 18, 12 | 1, 0 | 100, 100 | 11, 21 | 1, 1. |
| | | 3 | inf., inf | 32, 20 | 2, 3 | 5, 4 | 1, 4 | 0, 0 | 100, inf | 13, 16 | 6, 6. |
| | | 4 | inf., inf | 53, 29 | 7, 9 | 37, 16 | 7, 9 | 1, 3 | 39, S | 10, 10 | 3, 1. |
| | | 5 | inf., inf | 43, 46 | 5, 2 | 15, 34 | 7, 5 | 1, 2 | inf., S | 100, 100 | 12, 13 |
| Rufomycin A phosphate. | 2.0 mg | 1 | inf., inf | 38, 100 | 7, 3 | 28, 11 | 7, 7 | 0, 0 | inf., inf | 100, 100 | 12, 10. |
| | | 2 | inf., inf | 85, 89 | 11, 15 | 100, 100 | 31, 38 | 6, 4 | inf., inf | 14, 5 | 9, 4. |
| | | 3 | inf., inf | 48, 33 | 2, 1 | 15, 12 | 3, 3 | 1, 1 | 47, 30 | 20, 9 | 4, 3. |
| | | 4 | inf., inf | 38, 36 | 4, 0 | 21, 8 | 6, 2 | 0, 0 | 86, 40 | 8, 4 | 3, 0. |
| | | 5 | 69, 55 | 14, 10 | 0, 0 | 70, 54 | 11, 1 | 1, 1 | 7, 6 | 8, 4 | 2, 0. |
| | 1.0 mg | 1 | inf., inf | 100, 50 | 11, 7 | S, S | 84, 81 | 7, 3 | inf., inf | S, S | S, S. |
| | | 2 | inf., 100 | 24, 17 | 2, 1 | S, S | 0, S | 0, 0 | S, S | S, S | 3, S. |
| | | 3 | inf., inf | inf., inf | 51, 37 | S, S | S, S | 9, 4 | S, S | 35, S | 40, S. |
| | | 4 | inf., inf | 33, 28 | 7, 0 | 10, 5 | 6, 5 | 1, 1 | inf., inf | 54, 97 | 9, 5. |
| | | 5 | 5, 4 | 1, 0 | 0, 0 | 60, S | 30, 19 | 4, 2 | inf., inf | inf., 56 | 21, 8. |
| Rufomycin A phosphate ammonium salt. | 2.0 mg | 1 | inf., inf | 40, 22 | 5, 2 | 40, 50 | 3, 7 | 0, 1 | inf., inf | 30, 38 | 3, 1. |
| | | 2 | inf., inf | 50, 53 | 4, 5 | 37, 39 | 5, 7 | 1, 2 | 100, 100 | 18, 17 | 2, 5. |
| | | 3 | inf., inf | 43, 47 | 2, 5 | 70, 40 | 11, 14 | 0, 3 | inf., inf | 28, 50 | S. S. |
| | | 4 | inf., inf | 42, 44 | 5, 15 | inf., inf | 18, 24 | 1, 3 | inf., inf | S, 26 | 3, 4. |
| | 1.0 mg | 1 | 100, 100 | 21, 20 | 0, 1 | S, S | S, S | 0, S | inf., inf | 100, 100 | 18, 23. |
| | | 2 | 100, 100 | 21, 16 | 1, 2 | 33, 21 | 3, S | 0, 0 | inf., 100 | 24, 129 | 0, 3. |
| | | 3 | 100, 100 | 31, 17 | 4, 2 | 9, 30 | 0, 2 | 1, 0 | inf., S | 29, 50 | 1, 2. |
| | | 4 | 100, 100 | 48, 32 | 4, 2 | 8, 6 | 15, 21 | 3, 0 | inf., inf | 100, 100 | 21, 9. |
| | | 5 | 100, 100 | 40, 29 | 4, 6 | 4, 6 | 16, 10 | 1, 1 | 100, 100 | 70, 53 | 6, 4. |

The invention will now be described in further particularity by means of the following examples. It will be understood, of course, that the invention is not limited to the particular details of these examples since they only set forth preferred exemplary embodiments of the invention. In these examples, the relation between part by weight and part by volume is the same as that between gram and milliliter.

EXAMPLE 1

To a solution of 1 part by weight of rufomycin A in 50 parts by volume of pyridine was added 0.25 part by weight of succinic anhydride, and the mixture was allowed to stand for 40 hours at room temperature. Then, the mixture was poured into 450 parts by volume of ice-water. The resulting suspension was extracted twice with 100 parts by volume each of ethyl acetate and the remaining aqueous layer was lyophilized to dryness. The residue was washed with a little amount of water and the insoluble substance was collected by filtration under suction, and dried under reduced pressure to give 0.6 part by weight of rufomycin A hemi-succinate. The infra-red spectrum of rufomycin A hemi-succinate is shown as FIGURE 1.

This product was dissolved in diluted aqueous ammonia solution, the quantity of which is preferably as little as possible, and the solution was lyophilized to dryness to give ammonium salt of rufomycin A hemi-succinate, the salt being soluble in water.

EXAMPLE 2

A solution of 0.5 part by volume of chlorosulfonic acid in 10 parts by volume of pyridine was added dropwise under ice-cooling into a solution of 1 part by weight of rufomycin A in 30 parts by volume of pyridine, and the mixture was allowed to stand overnight at room temperature. The reaction mixture was poured into a little amount of ice-water, to form precipitates therein. The precipitates were collected by centrifugation and dried under reduced pressure to give 0.6 part by weight of rufomycin A hemi-sulfate. The infra-red spectrum of rufomycin A hemi-sulfate is shown as FIGURE 2.

To convert the product into the corresponding water-soluble sodium salt, the former was dissolved in a diluted aqueous sodium-hydrogen-carbonate solution, the quantity of which is preferably as little as possible, and the solution was lyophilized to dryness to give the latter.

EXAMPLE 3

A solution of 2 parts by volume of phosphorus oxychloride in 50 parts by weight of pyridine was added dropwise into a solution of 14 parts by volume of rufomycin A in 110 parts by volume of pyridine under ice-cooling and vigorous agitation, and reaction was allowed to continue for about one hour from the start of the addition. The reaction mixture was poured into 1,500 parts by volume of ice-water. The resulting suspension was at once lyophilized to dryness. The residue was washed with 200 parts by volume of water and the insoluble substance was separated from the washings and dried under reduced pressure to give 12.5 parts by weight of rufomycin A phosphate. The infra-red spectrum of rufomycin A phosphate is shown as FIGURE 3.

*Elementary analysis.*—P: 3.07%, 2.99%.

The product was further allowed to change into its ammonium, sodium and potassium salts, respectively, being soluble in water, in a similar manner to those in Examples 1 and 2.

EXAMPLE 4

In 10 parts by volume of dry pyridine was dissolved 1 part by weight of rufomycin B. A solution of 0.5 part by volume of phosphorus oxychloride in 4.5 parts by volume of pyridine was gradually added to the aforeprepared solution under stirring at 0° C. After a halfhour-stirring, there precipitated pyridine hydrochloride in the reaction mixture. Then, the mixture was poured into ice-water. The aqueous mixture was filtered and the filtrate was lyophilized to dryness. The residue was treated with a little amount of water to remove the coexisting pyridine hydrochloride and to give 1 part by weight of rufomycin B mono-phosphate containing 2.83 percent by weight of phosphorus.

The product was further allowed to change into its ammonium, sodium, potassium, calcium, magnesium and triethylammonium salts, respectively, which are all soluble in water, in a similar manner to those in Examples 1 and 2.

We claim:

1. A partial ester of an organic polybasic acid with a mole of a member selected from the group consisting of rufomycin A and rufomycin B, the polybasic acid having at least two carboxyl groups and four to ten carbon atoms and being selected from the group consisting of succinic acid, maleic acid, fumaric acid, malic acid, glutaric acid, adipic acid, pimelic acid, azelaic acid, sebacic acid, citric acid, citraconic acid, phthalic acid and terephthalic acid.

2. A partial ester of an inorganic acid with a mole of a member selected from the group consisting of rufomycin A and rufomycin B, the polybasic acid having at least two acidic hydroxyl groups and being selected from the group consisting of sulfuric acid and phosphoric acid.

3. A water-soluble salt of the partial ester claimed in claim 1, the base moiety of the salt being a member selected from the group consisting of ammonium, sodium and potassium.

4. A water-soluble salt of the partial ester claimed in claim 2, the base moiety of the salt being a member selected from the group consisting of ammonium, sodium and potassium.

5. Trialkylammonium salt of the partial ester claimed in claim 1, the alkyl moiety being either ethyl or methyl.

6. Trialkylammonium salt of the partial ester claimed in claim 2, the alkyl moiety being either ethyl or methyl.

7. Rufomycin A hemi-succinate.

8. Ammonium salt of rufomycin A hemi-succinate.

9. Rufomycin A hemi-sulfate.

10. Sodium salt of rufomycin A hemi-sulfate.

11. Rufomycin A mono-phosphate.

12. Rufomycin B mono-phosphate.

References Cited

UNITED STATES PATENTS

| | | | |
|---|---|---|---|
| 2,871,160 | 1/1959 | Johnson | 167—77 |
| 2,970,944 | 2/1961 | Charnicki | 167—77 |

OTHER REFERENCES

Merck Index, Sixth Edition, 1952, Merck and Co., Rahway, N.J., p. 907.

ALBERT T. MEYERS, *Primary Examiner.*

JULIAN S. LEVITT, *Examiner.*

SAM ROSEN, *Assistant Examiner.*